Oct. 20, 1953    R. N. STICH    2,656,169
ROCK-GROOVING TOOL
Filed March 28, 1949
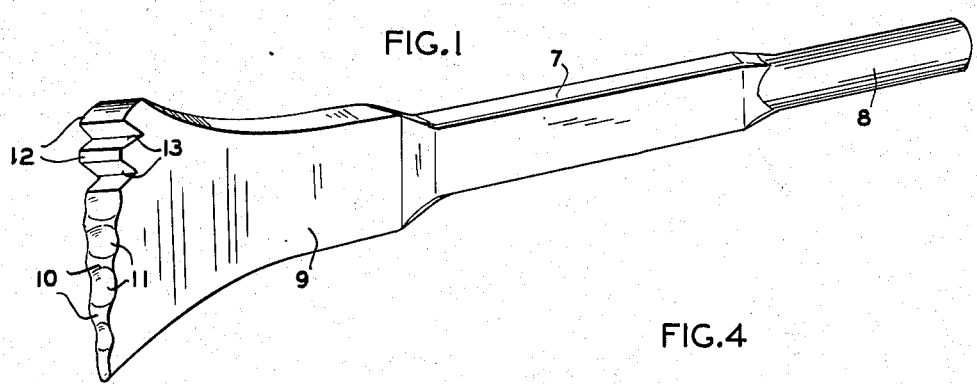
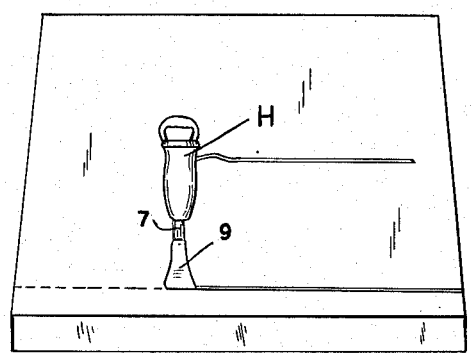
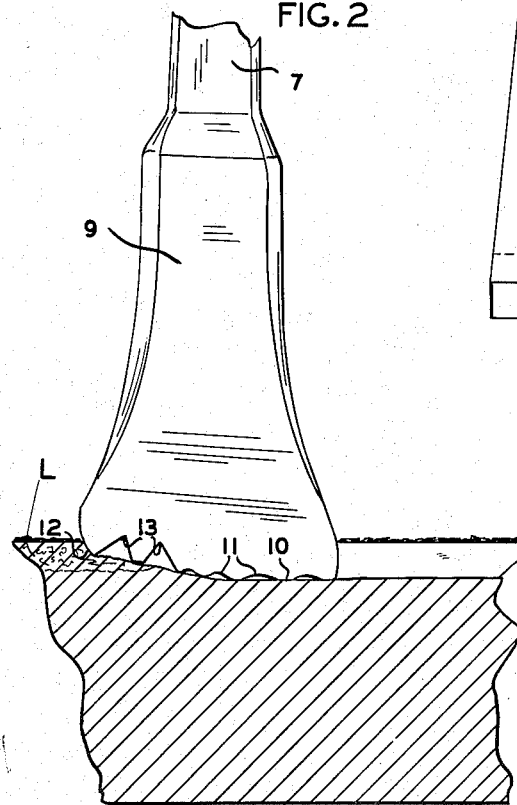
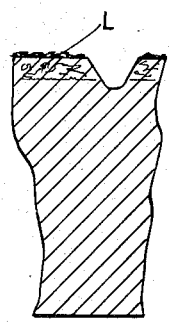
INVENTOR.
RAYMOND N. STICH
BY
ATTORNEYS

Patented Oct. 20, 1953

2,656,169

UNITED STATES PATENT OFFICE 2,656,169

ROCK-GROOVING TOOL

Raymond N. Stich, Minneapolis, Minn.

Application March 28, 1949, Serial No. 83,935

3 Claims. (Cl. 262—33)

This invention relates to rock cutting tools and particularly to a tool for grooving rock preparatory to the rough cutting thereof.

It has long been a problem in the cutting of relatively narrow strips of stone from larger slabs to prevent chipping off of the stone and spoiling thereof. By initially grooving the stone to create a line of weakness and thereafter splitting the same, such undesirable chipping will be largely eliminated.

It is an object of my invention to provide a tool particularly designed for quickly and efficiently cutting a groove in a slab of rock.

It is another object to provide a toothed rock-grooving tool to facilitate the grooving operation.

It is a further object to provide a rock-grooving tool having a toothed beveled cutting edge tapered toward the outer portion thereof and also from the front to the rear portions thereof to facilitate cutting the tapered groove substantially as shown.

These and other objects and advantages of my invention will more fully appear from the following description made in connection with the accompanying drawings wherein like reference characters refer to similar parts throughout the several views and in which:

Fig. 1 is a perspective view of my rock-grooving tool which is adapted to be mounted in a conventional pneumatic hammer (not shown);

Fig. 2 is a side elevational view of the tool in grooving position in a rock slab, said slab being shown in vertical section;

Fig. 3 is a transverse vertical sectional view showing the tapered shape of the groove cut in a slab preparatory to splitting the same; and Fig. 4 is a top perspective view showing my grooving tool in operative position in the lower portion of a pneumatic hammer illustrating a typical position thereof in the grooving of a stone slab.

As shown in the accompanying drawing I provide a rock-grooving tool having a straight shank portion 7 with a diminished cylindrical upper portion 8 adapted to be received in a pneumatic hammer H, as shown in Fig. 4, to be rapidly reciprocated thereby with a vibratory action. The lower portion of the tool is enlarged to form a head 9 which is flattened into a tapered shape diminishing longitudinally toward the lower end thereof to form the cutting edge of the tool. As best shown in Fig. 1, the head 9 is thickened at the forward edge thereof and gradually diminished transversely toward the rear thereof so that the cutting edge tapers from the front end to the diminished rear end thereof. The cutting edge of the tool is also beveled from the rear edge to the front edge so that when the tool is in substantially vertical position, the front portion of the cutting edge will be slightly elevated above the rear portion thereof, as best shown in Fig. 2.

The rear diminished portion of the cutting edge has a plurality of relatively short wide teeth 10 with rounded grooves or depressions 11 formed therebetween. The thickened forward portion of the cutting edge has a plurality of relatively long teeth 12 with deepened V-grooves 13 formed therebetween. In the form of my invention illustrated, the relatively short rounded wide teeth 10 extend somewhat more than half way along the cutting edge, and the widened longer teeth 12 are disposed only in the forward portion of the cutting edge. I have found that longer teeth in the rear portion of the cutting edge cut too fast and also tend to chip and wear away faster than the blunt relatively short teeth which are considerably durable. Since the longer teeth 12 engage for the most part only the relatively soft rotten top layer of the slab being grooved and since they serve primarily to level the groove by cutting away any high spots which may be formed on the slab, they are not subject to the wear which would occur if they were placed toward the lower rear portion of the cutting edge which carries most of the downward pressure exerted on the slab.

As shown in Figs. 2 and 4 of the drawing, the tool is operated in substantially vertical position and is most efficiently used in a conventional pneumatic hammer, as shown in Fig. 4, but of course could be used merely with an ordinary hammer to substantially vertically reciprocate the same by striking the upper extreme end thereof with a succession of downwardly directed blows. The purpose of the grooving tool is to merely score or form a very shallow groove in the solid rock after penetrating through the relatively rotten top layer L, which is shown in Figs. 2 and 3. Also, it is important that this score line in the solid rock is relatively level, whereas the actual surface of the rock may be relatively rough with a number of peaks and depressions. The long forward teeth of the rock-grooving tool serve to level off said surface by rapidly cutting away the peaks.

The transverse tapering of the head 9 combines with the beveling of the cutting edge to permit the tool to groove out a shallow V-shaped groove, as shown in Fig. 3, which is substantially level from one end thereof to the other. With the tool disposed substantially vertically, the thickened forward portion of the cutting edge will ride along the slab a slight distance above the trailing diminished portion of said cutting edge which will penetrate below the forward portion and form the lower diminished portion of the V-shaped groove. In rough cut stone, it is undesirable to have any tool marks thereon, and therefore the groove in the solid rock is merely a score line to form a plane of weakness along which the relatively narrow rock strip may be broken by the use of a conventional rock-cutting chisel. As long as the score line is substantially level, the rock will split therealong, and a satisfactory stone for veneering or other uses will be provided. The conventional way of splitting rock at the present time is to drill a plurality of aligned holes a substantial distance into the slab and thereafter drive wedges into the edge of the holes until the rocks split along the line through said holes. This caused considerable wastage of both time and material because the area around the holes had to be cut away so that the tool marks would not show. With my improved grooving tool this drilling operation is reduced to an absolute minimum and in most cases is eliminated entirely.

It will be seen that I have provided a novel and extremely efficient rock-grooving tool which is adapted to cut a substantially level score line across a slab of stone to permit said slab to be split along said line.

It will, of course, be understood that various changes may be made in the form, details, arrangement and proportions of the parts without departing from the scope of my invention.

What I claim is:

1. A rock-grooving tool comprising an elongated shank adapted to be reciprocated by a series of downwardly directed blows thereon, a cutting head fixed at the lower end of said shank, and a cutting edge formed at the lower extremity of said head, said edge being beveled downwardly toward the rear end thereof and being tapered from the front to the rear edge thereof to permit a substantially level score line to be cut in a rock slab by substantially vertical operation of the tool.

2. A rock-grooving tool comprising an elongated shank adapted to be reciprocated by a series of downwardly directed blows, a cutting head fixed to one end of said shank and longitudinally tapered toward the outer end thereof, said cutting head being thickened at the forward edge thereof and tapering transversely to the diminished rear portion thereof to form a cutting edge at the outer extremity thereof thicker at the forward end than at the rear end, a plurality of relatively long teeth formed in the thickened forward portion and a plurality of relatively short teeth formed in the diminished rear portion thereof.

3. A rock-grooving tool comprising a cutting head with a cutting edge formed at the lower end thereof and having a plurality of teeth formed therein and being tapered from the front to the rear end thereof, the teeth in the thickened portion thereof being longer than the teeth in the rear diminished portion thereof, and a blow receiving shank formed at the upper end of said head.

RAYMOND N. STICH.

References Cited in the file of this patent

UNITED STATES PATENTS

| Number | Name | Date |
|---|---|---|
| 895,387 | Mercer | Aug. 4, 1908 |
| 1,023,409 | Batulis | Apr. 16, 1912 |
| 1,995,062 | Gray et al. | Mar. 19, 1935 |

FOREIGN PATENTS

| Number | Country | Date |
|---|---|---|
| 105,173 | Austria | Jan. 10, 1927 |
| 468,999 | Great Britain | July 16, 1937 |
| 659,481 | Germany | May 4, 1938 |